(12) United States Patent
Ishikawa

(10) Patent No.: US 7,787,002 B2
(45) Date of Patent: Aug. 31, 2010

(54) DIGITAL WRITING APPARATUS

(75) Inventor: Naoichi Ishikawa, Saitama (JP)

(73) Assignee: Ricoh Company, Limited, Tokyo (JP)

( * ) Notice: Subject to any disclaimer, the term of this patent is extended or adjusted under 35 U.S.C. 154(b) by 339 days.

(21) Appl. No.: 11/275,940

(22) Filed: Feb. 6, 2006

(65) Prior Publication Data

US 2006/0181595 A1 Aug. 17, 2006

(30) Foreign Application Priority Data

Feb. 14, 2005 (JP) ............................. 2005-036620

(51) Int. Cl.
*B41J 2/385* (2006.01)
(52) U.S. Cl. ....................... 347/130; 347/131
(58) Field of Classification Search ........................ None
See application file for complete search history.

(56) References Cited

U.S. PATENT DOCUMENTS

| | | | | |
|---|---|---|---|---|
| 4,746,941 A | * | 5/1988 | Pham et al. | 358/1.8 |
| 5,144,338 A | * | 9/1992 | Sakano | 347/252 |
| 5,253,934 A | * | 10/1993 | Potucek et al. | 347/237 |
| 5,825,400 A | * | 10/1998 | Florence | 347/239 |
| 5,892,532 A | * | 4/1999 | Katakura et al. | 347/240 |
| 6,693,659 B2 | * | 2/2004 | Okumura et al. | 347/240 |
| 2004/0008247 A1 | * | 1/2004 | Masuda | 347/238 |
| 2004/0210345 A1 | * | 10/2004 | Noda et al. | 700/245 |
| 2005/0117133 A1 | | 6/2005 | Ishikawa | |
| 2006/0044386 A1 | | 3/2006 | Ishikawa | |

FOREIGN PATENT DOCUMENTS

| | | |
|---|---|---|
| JP | 05-024256 | 2/1993 |
| JP | 05-075814 | 3/1993 |
| JP | 07-336537 | 12/1995 |
| JP | 2000-118034 | 4/2000 |
| JP | 2004-216709 | 8/2004 |
| JP | 2005-169799 | 6/2005 |

OTHER PUBLICATIONS

U.S. Appl. No. 11/456,269, filed Jul. 10, 2006, Ishikawa.

* cited by examiner

*Primary Examiner*—Stephen D Meier
*Assistant Examiner*—Alexander C Witkowski
(74) *Attorney, Agent, or Firm*—Oblon, Spivak, McClelland, Maier & Neustadt, L.L.P.

(57) ABSTRACT

In transfer of even pixel data, focusing on even-number data, only the even data is selected out of eight pixels of image data read out from a storage circuit and transferred to an LED head in a unit of four bits. Four pixel data are simply selected out of eight pixels without performing one-pixel conversion. In transfer of odd pixel data, focusing on odd data, when data is "0", "0" is directly transferred. When data is "1", if the previous pixel data is "1", "1" is directly transferred, and if the previous pixel data is "0", data is converted into "0" to be transferred.

10 Claims, 7 Drawing Sheets

DOT DIAMETER IMAGE

DIGITAL WRITING APPARATUS

CROSS-REFERENCE TO RELATED APPLICATIONS

The present document incorporates by reference the entire contents of Japanese priority document, 2005-036620 filed in Japan on Feb. 14, 2005.

BACKGROUND OF THE INVENTION

1. Field of the Invention

The present invention relates to an image writing apparatus that uses a light-emitting device array.

2. Description of the Related Art

In an image writing apparatus that writes a latent image on a photosensitive member by irradiating light, a laser diode (LD) scanning system and a system (light-emitting-device array system) using a light-emitting-device array are used. The light-emitting-device array system uses light-emitting diodes (LED) arranged in an array. In the light-emitting-device array system, when an image forming apparatus outputs a binary image, a one-dot character is printed in an elliptical shape, which is long in a horizontal direction, depending on process conditions. In a one-dot lattice image (an image with dot intervals of five millimeters), the elliptical shape appears clearly. As a result, vertical lines are printed thicker than horizontal lines to cause a problem in an aspect ratio.

To solve the problem, there is a system for controlling the aspect ratio using balance correction data for LEDs. As a system using multiple value data, gradation data for each LED, data for correcting output fluctuation by a unit of block including plural LEDs, and data for correcting output fluctuation in an average value of blocks are added. Fluctuation in LEDs is controlled based on added data.

As a system using two values, there is control for faithfully reproducing gradation by adding data of a binary image and correction data of respective LEDs. Since print power of dots (print drive current control) is adjusted, a line image is improved. However, the aspect ratio is still not improved.

Some LED light-emitting device arrays do not use the system for adding correction data and print image data.

In a technology described in Japanese Patent Application No. 2003-412065, an LED writing control circuit controls LEDs by lighting the LEDs for several times. The LEDs are lit twice, respectively, when an image is transferred once in a light-emitting-device array unit that transfers odd-number image data after transferring even-number image data.

As another method, there is a system for transferring image data several times in one line to control a lighting signal. In this system, one-line data is transferred several times in one line to control the lighting signal and perform printing. Consequently, it is possible to faithfully print a line image formed with oblique lines. Although an aspect ratio of a printed image is not improved, since thickness of horizontal lines is increased, a ratio of vertical lines and horizontal lines is improved.

As another technology, there is a system for transferring image data several times in one line and recognizing a one-dot isolated point in a main scanning direction to control data processing. In this system, data transfer is performed several times (twice), a pattern is recognized in the main scanning direction, and when the one-dot isolated point is found, data is processed to be changed from "1" to "0" to reduce a vertical line width and improve vertical and horizontal line widths.

When data transfer, data processing, and lighting time are controlled to reduce a vertical line width and clarify a horizontal line width, more accurately, a ratio of vertical and horizontal line widths, it is possible to obtain an image writing apparatus with improved performance. For example, when an image density is 600 dots per inch (dpi), a dot diameter is 42.33 micrometers (mm). The dot diameter slightly increases depending on process conditions and fixing properties. However, the dot diameter has to be set as close as possible to the dot diameter in the case of 600 dpi.

SUMMARY OF THE INVENTION

It is an object of the present invention to at least solve the problems in the conventional technology.

A digital writing apparatus according to one aspect of the present invention includes a plurality of array units each including a light-emitting device array in which a plurality of light-emitting devices are arrayed in one direction, the light-emitting devices configured to emit light based on binary image data; and an image forming unit configured to form an image with light emitted from the light-emitting device array on a photosensitive member; and a image transfer unit configured to divide image data equivalent to one line for each of the array units, to transfer to respective array unit, and to drive each of the light-emitting devices to perform main scanning. The array units are arranged such that each of the array units is shifted by a predetermined amount from each other in a sub-scanning direction and overlapped with each other by a predetermined amount in a main scanning direction, the main scanning direction being an axial direction of the photosensitive member, and the image transfer unit is configured to transfer divided data for a plurality of times and to variably control a lighting time while subjecting the image data to data processing in a period of scanning one line in the main scanning direction.

The other objects, features, and advantages of the present invention are specifically set forth in or will become apparent from the following detailed description of the invention when read in conjunction with the accompanying drawings.

DETAILED DESCRIPTION OF THE PREFERRED EMBODIMENTS

Exemplary embodiments according to the present invention are explained in detail below with reference to the accompanying drawings.

Figure 1:
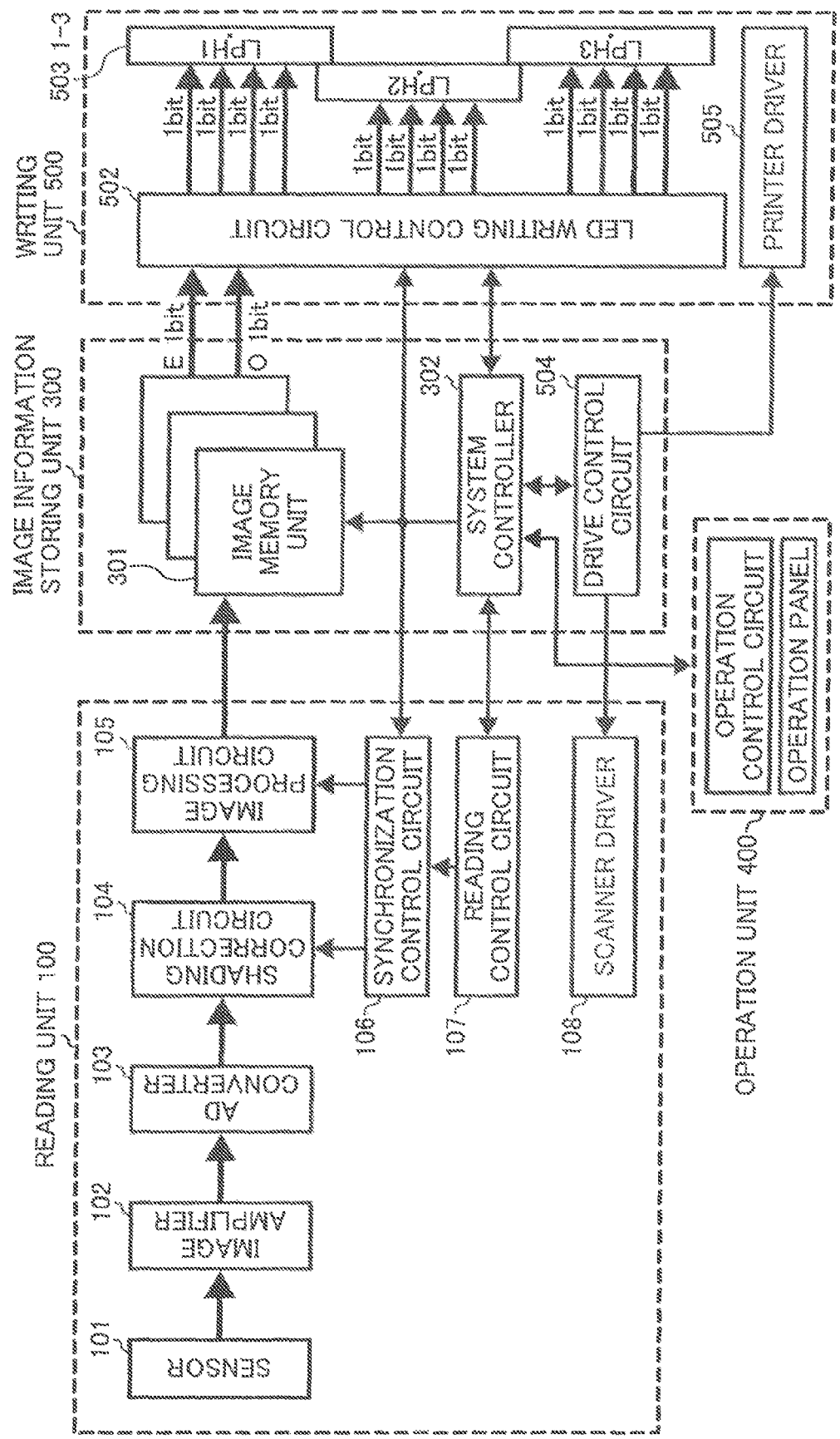
FIG. 1 is a block diagram of a copying machine according to an embodiment of the present invention.

FIG. 1 is a block diagram of a copying machine according to an embodiment of the present invention. The copying machine includes a reading unit 100 that reads an original, an image information storing unit 300 that stores original information read, a writing unit 500 that copies the information on transfer paper, a system controller 302 that controls execution of a series of process, and an operation unit 400 that applies key input to the system controller 302.

Figure 2:
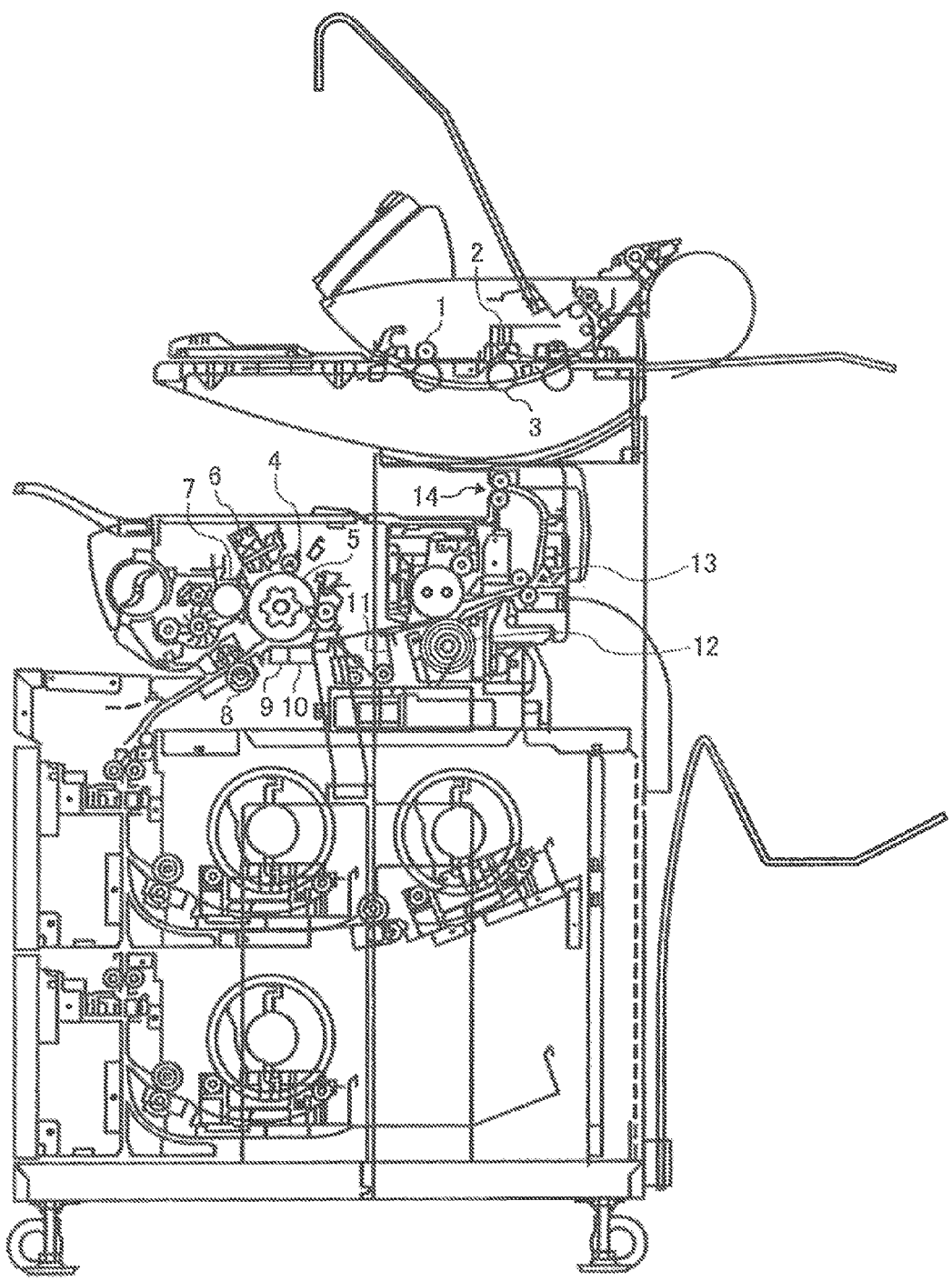
FIG. 2 is a schematic diagram of the copying machine.
Figure 3A:
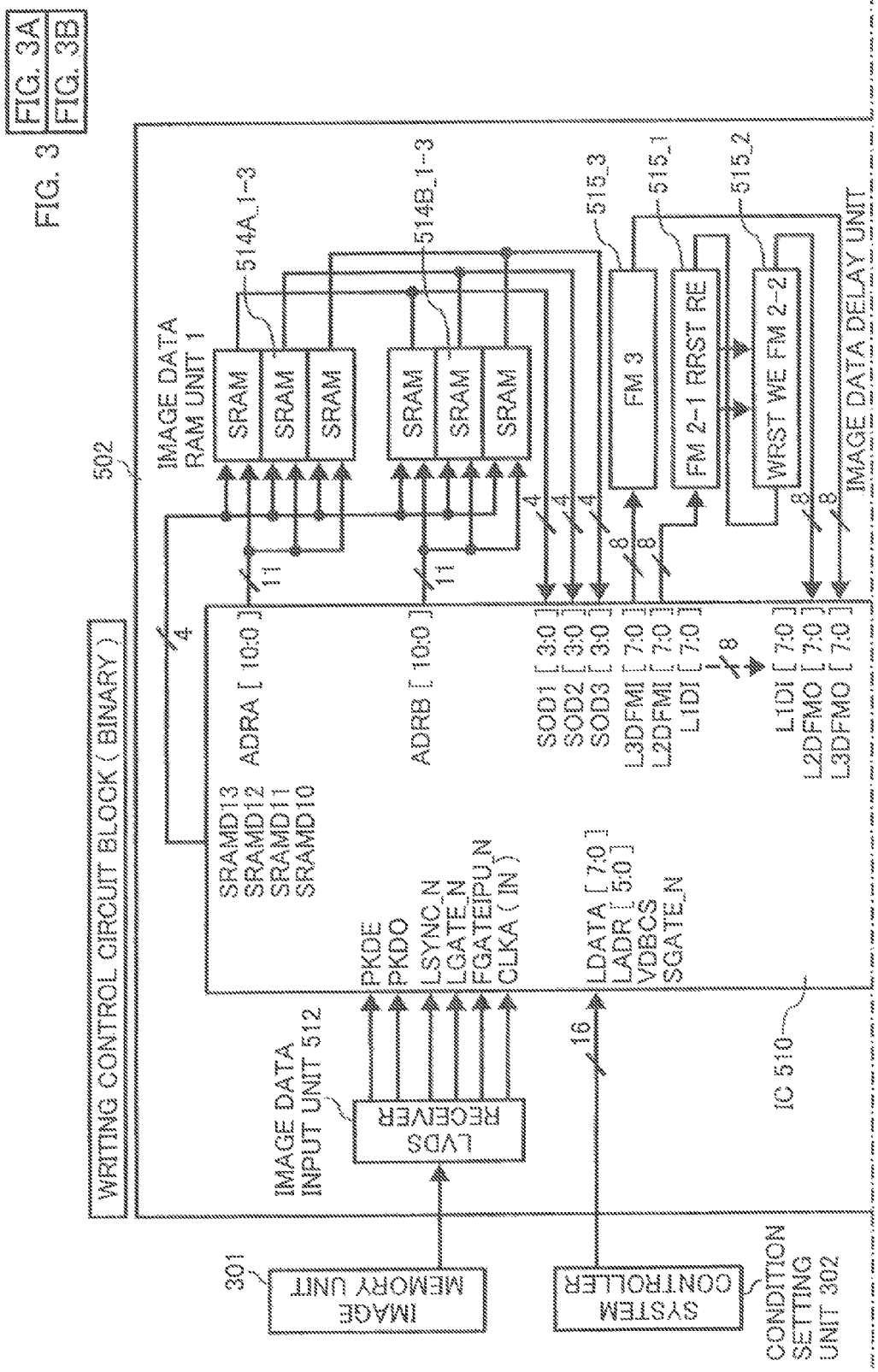
FIG. 3 is a schematic diagram of an LED writing control circuit shown in FIG. 1.
Figure 3B:
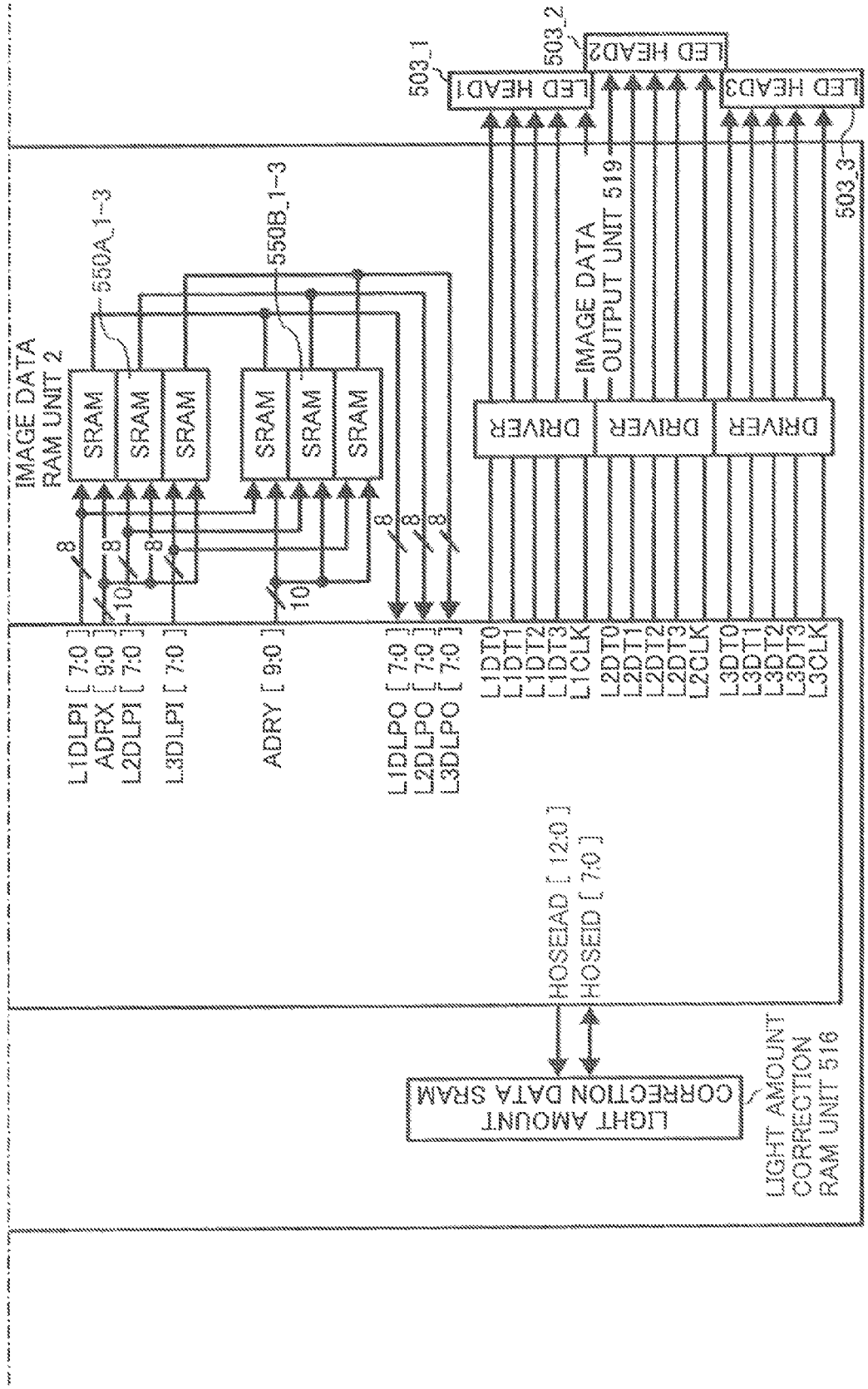

FIG. 2 is a side view of the copying machine. When an operator inserts an original from an insertion port, the original is conveyed between a contact sensor 2 and a white roller 3 according to rotation of a roller 1. Light is irradiated on the original by an LED attached to the contact sensor 2 while the original is conveyed. Light reflected on the original is focused on the contact sensor 2 and original image information is read.

An original image focused on a sensor 101 shown in FIG. 1 is converted into an electric signal. The analog image signal is amplified by an image amplifier 102. An analog/digital (A/D) converter 103 converts the analog image signal amplified by the image amplifier 102 into a multi-value digital image signal for each pixel.

The digital image signal converted is output in synchronization with a clock output from a synchronization control circuit 106. A shading correction circuit 104 corrects distortion of the digital image signal due to unevenness in a light amount, stains on a contact glass, unevenness in sensitivity of a sensor, and the like. An image processing circuit 105 converts digital image information of the corrected digital image signal into digital recording image information. Then, the digital recording image information is written in an image memory unit 301.

The system controller 302 and the writing unit 500 control a series of process for forming an image on transfer paper from the image signal written in the image memory unit 201. The system controller 302 has a function of performing overall control. The system controller 302 controls image data transfer in a reading control circuit 107, the synchronization control circuit 106, the image memory unit 301, and an LED writing control circuit 502. The system controller 302 drives a motor or the like via a scanner driver 108 or a printer driver 505 using a drive control circuit 504 and smoothly controls conveyance of an original to be read and transfer paper.

In the writing unit 500, an image signal transferred from the image memory unit 301 according to a synchronization signal clock is subjected to bit conversion by a unit of one pixel by the LED writing control circuit 502 and converted into infrared light by an LED print head (LPH) 503 to be output.

A charger 4 is a so-called scorotron charger with a grid that uniformly charges a photosensitive drum 5 to −1200 volts (V). A light-emitting-device array unit (an LED head) 6 is formed by arranging LEDs in an array. Light from the light-emitting-device array unit 6 is irradiated on the photosensitive drum 5 via a Selfoc lens array (SLA). The LED head of the light-emitting-device array unit 6 is equivalent to the LPH 503 shown in FIG. 1.

When LED light based on digital image information is irradiated on the photosensitive drum 5, an electric charge on a photosensitive member surface flows to a ground of the photosensitive drum 5 and disappears because of a photoconductive phenomenon. The LEDs are prevented from emitting light on a portion of an original with low concentration and caused to emit light on a portion of the original with high concentration. Consequently, an electrostatic latent image corresponding to a gray scale of an image is formed in a portion of the photosensitive drum 5 where LED light is not irradiated.

The electrostatic latent image is developed by a developing unit 7. A toner in the developing unit 7 is negatively charged by agitation and a bias of −700 V is applied to the toner. Thus, the toner adheres to only the portion where LED light is not irradiated.

On the other hand, transfer paper is fed selectively from three sheet feeding trays and a hand feed tray and passed below the photosensitive drum 5 at predetermined timing by a registration roller 8. At this point, a toner image is transferred onto the recording paper by a transfer charger 9. The recording paper is separated from the photosensitive drum 5 by a separation charger 10 and conveyed by a conveyance tank 11 to be sent to a fixing unit 12. The toner is fixed on the recording paper in the fixing unit 12. The recording paper having the toner fixed thereon is sent to the front and the rear on the outside of the copying machine to be discharged by a sheet discharge tray 14 or 13.

As a flow of image signals, binary image data of even pixels (EVEN) and odd pixels (ODD) are simultaneously sent to the LED writing control circuit 502 at a transfer speed of 16 megahertz (MHz) from the image memory unit 301. The image signals, of which the pixels are sent in parallel, are combined into one line inside the LED writing control circuit 502 once, and then, divided into three. Four pixels of the image signals are simultaneously transferred to LED heads 503_1, 503_2, and 503_3.

Binary image signals, that is, even pixels (EVEN), odd pixels (ODD), and a timing signal, are converted from parallel signals to serial signals using a low-voltage-actuation-signal-element LVDS receiver and sent to the LED writing control circuit 502 at 16 MHz from the image memory unit 301. The LED writing control circuit 502 also uses the LVDS receiver. The signals are also converted into serial signals to parallel signals by the LED writing control circuit 502 to be input to an IC 510 as PKDE•PKDO•CLKA•LSYNC_N•LGATE_N•FGATEIPU_N.

The image signals of even pixels (EVEN) and odd pixels (ODD) input to the IC 510 are changed to signals by a unit of four pixels and stored in three Static random access memories (SRAMs) in an A group (514A_1 to 514A_3) and three SRAMs in a B group (514B_1 to 514B_3) at a transfer speed of 8 MHz as SRAMDI[3:0] according to SRAM address signals ADRA[10:0] and ADRB[10:0].

Since a total dot number is 23040 dots (A3 width 7680 dots×3) and an image signal is transferred in a three division system, as image signals for one main scanning line, an image signal of an LED head 1 503_1 is stored in the SRAM 1 514A_1 in the A group, an image signal of an LED head 2 503_2 is stored in the SRAM 2 514A_2, and an image signal of an LED head 3 503_3 is stored in the SRAM 3 514A_3.

The image signals sequentially stored in the three SRAMs in the A group (514A_1 to 514A_3) at 8 MHz are simultaneously read out to the next second line from the three SRAMs in the A group (514A_1 to 514A_3) at 4 MHz and input to the IC 510 again. The image signals are converted into the image signals by a unit of four pixels to image signals by a unit of eight pixels and sent to field memories 515_1 to 515_3 of an image delay memory unit at a transfer speed of 2 MHz. At this point, the LED head 1 503_1 does not operate in delay.

The image signal of the LED head 2 503_2 is transferred to the field memory 515_1 and the image signal of the LED head 3 503_3 is transferred to the field memory 515_3. While control for reading out the image signals from the SRAMs in the first line, the image signals are stored in the three SRAMs 514B_1 to 514B_3 in the B group in the next line in the same manner as the SRAMs in the A group.

The read/write operation for the three SRAMs in the A group (514A_1 to 514A_3) and the three SRAMs in the B group (514B_1 to 514B_3) is subjected to toggle operation to thereby connect the SRAMs in the respective lines.

(1) Image Signal Delay Units 515_1 and 515_2 of the Led Head 2 503_2

Since three A3 width LED heads 515_1 to 515_3 are arranged in a zigzag, with the LED head 1 503_1 as a reference, the LED head 2 503_2 is attached to be shifted by 17.5 millimeters (mm) in a sub-scanning direction in terms of a mechanical layout.

Therefore, when the image signals output from the three SRAMs in the A group (514A_1 to 514_3) and the three SRAMs in the B group (514B_1 to 514B_3) are simultaneously processed and transferred to the LED head 2 503_2, the LED head 2 503_2 is shifted by 17.5 mm (17.5 mm/42.3 μm (one dot at 600 dpi)=416 lines) in the sub-scanning direction with respect to the LED head 1 503_1.

To correct this mechanical shift, the image signals of the LED head 2 503_2 output from the SRAM 2 514A_2 in the A group and the SRAM 2 514B_2 in the B group are written in the field memory 515_1 at 2 MHz in an order of transfer lines by 180 lines (fixed) with eight pixels as a unit. Subsequently, the image signals are read out from the field memory 515_1 at 2 MHz in an order of the writing and simultaneously written in the field memory 515_2 connected to the field memory 515_1 in a cascade by 236 lines (variable).

The image signals are read out from the field memory 515_2 at 2 MHz in the order of the writing and input to the IC 510 again as L2DFMO[7:0]. Consequently, the image signals of the LED head 2 503_2 are delayed by 416 lines. Since the number of lines to be delayed is different depending on component accuracy of the LED head 2 503_2 and fluctuation in assembly, it is possible to control the number of lines to be delayed by a unit of one line (42.3 micrometers)

(2) Image Data Delay Unit of the Led Head 3 503_3

Since three A3 width LED heads 515_1 to 515_3 are arranged in a zigzag, with the LED head 1 503_1 as a reference, the LED head 3 503_3 is attached to be shifted by 0.5 mm in the sub-scanning direction in terms of a mechanical layout.

Therefore, When the image signals output from the three SRAMs in the A group (514A_1 to 514_3) and the three SRAMs in the B group (514B_1 to 514B_3) are simultaneously processed and transferred to the LED head 3 503_3, the LED head 3 503_3 is shifted by 0.5 mm (0.5 mm/42.3 μm (1 dot at 600 dpi)=12 lines) in the sub-scanning direction with respect to the LED head 1 503_1.

To correct this mechanical shift, the image signals of the LED head 3 503_3 output from the SRAM 3 514A_3 in the A group and the SRAM 3 514B_3 in the B group are written in the field memory 515_3 at 2 MHz in an order of transfer lines by 12 lines with eight pixels as a unit.

Subsequently, the image signals are read out from the field memory 515_3 at 2 MHz in an order of the writing and input to the IC 510 again as L3DFMO[7:0]. Consequently, the image signals of the LED head 3 503_3 are delayed by 12 lines.

Since the number of lines to be delayed is different depending on component accuracy of the LED head 3 503_3 and fluctuation in assembly, it is possible to control the number of lines to be delayed by a unit of one line (42.3 micrometers).

Image data L1DI[7:0] of the LED head 1 from an image data RAM unit 1 and image data L2DFMO[7:0] and L3DFMO[7:0] of LED heads 2 and 3 from the image delay unit are stored in SRAM groups 550A_1 to 3 of an image data RAM unit 2 at a transfer speed of 2 MHz via the IC 510, respectively.

The image data stored are read out four times at a transfer speed of 8 MHz in the next line. Since addresses are LED head 768 dots and by a unit of eight pixels, the addresses are equivalent to 960 addresses. The 960 addresses are repeated four times. Image data read out by a unit of eight pixels are subjected to data conversion by a unit of four pixels in the IC 510 and transferred to an image data output unit 519.

While the image data are read out in the SRAM group 550A_1 to 3, in the SRAM group 550B_1 to 3, the next line data are written and writing and readout of lines are alternately performed.

The image data output unit 519 is explained.

Image data by a unit of four bits of the LED heads 1 to 3 processed in the image data RAM unit 2 are output together with an LPH control signal and transferred to the respective LED heads 503_1 to 503_3 at a transfer speed of 8 MHz via a driver (data of L1 to L3 CLK are decided at a rising edge and a falling edge of 4 MHz).

To correct fluctuation in a light amount of respective LED elements, light amount correction ROMs having stored therein correction data for each of the LED elements and correction data for each of LED array chips are mounted on the LED heads 503_1 to 503_3.

When a power supply is turned on, light amount correction data of the LED head 503_1 is read out according to CPLD control of the IC 510, subjected to serial/parallel conversion, and stored in the light amount correction RAM unit 516 according to an address as correction data HOSEID[7:0] by a unit of eight bits. After all correction data are stored, the correction data are read out from a light amount correction data SRAM and transferred to the LED head 503_1 again. This operation is performed for the LED heads 2 and 3 in order.

The light amount correction data transferred are held inside the LED head 503_1 to 503_3 unless the power supply for the LED head 503_1 to 503_3 is turned off.

Condition setting for writing in the LED writing control circuit 502 is controlled by inputting a control signal input data bus LDATA[7:0], an address bus LADR[5:0], a latch signal VDBCS, and P sensor pattern signal SGATE_N from the system controller 302 to the IC 510.

Control for transfer of image data to a specific LED head in this embodiment including the overall mechanical constitution described above and the LED writing control circuit 502, a lighting time, and a print dot diameter and an image are described below.

Timing for data transfer to the LED head is explained with reference to FIG. 4. RLSYNC indicates an interval in one line of main scanning. A series of processing is performed in the RLSYNC. Image data is transferred at a rising edge and a falling edge of a clock.

DATA indicates image data by a unit of four pixels. As transfer image data, first, (1) even pixel data: EVEN DATA equivalent to 7680 pixels (3840 pixels*2) of the LED head is transferred.

Since 3840 dots, which are a half of the total pixels 7680 dots of the LED head, are transferred every four dots simultaneously, the number of pixels is equivalent to 960 counts (3840/4). After the transfer, data is latched by a LOAD signal.

(2) Odd pixel data: ODD data is transferred and latched by a LOAD signal. (3) Even data and (4) odd data are transferred and latched again. Printing and data transfer are repeated twice.

A lighting signal: STRB is LOW active. In printing of (1) the even pixel data, the lighting signal is set to LOW5 to cause the LEDs to emit light at the time of transfer of (2) the odd pixel data. In printing of (2) the odd pixel data, the lighting signal is set to LOW6 to cause the LEDs to emit light at the time of transfer of (3) the even pixel data.

In printing of (3) the even pixel data, the lighting signal is set to LOW7 to cause the LEDs to emit light at the time of transfer of (4) the odd pixel data. Thereafter, in printing of (4) the odd pixel data, the lighting signal is set to LOW8 to cause the LEDs to emit light. In this case, the STRB signal is set to LOW to cause the LEDs emit light. It is possible to adjust image printing time, control dot power, and uniformalize image concentration by controlling a period of LOW.

The image concentration is regulated by process conditions and the like. As mechanical conditions, STRB lighting and printing in a period equivalent to about 10 percent of an interval of one line of main scanning is appropriate. From a relation between a copy line speed and pixel density, a main scanning interval is calculated as 705.6 microseconds (usec). Since a lighting period is 10% of the main scanning interval, the lighting period is calculated as 70.56 usec.

Figure 5:
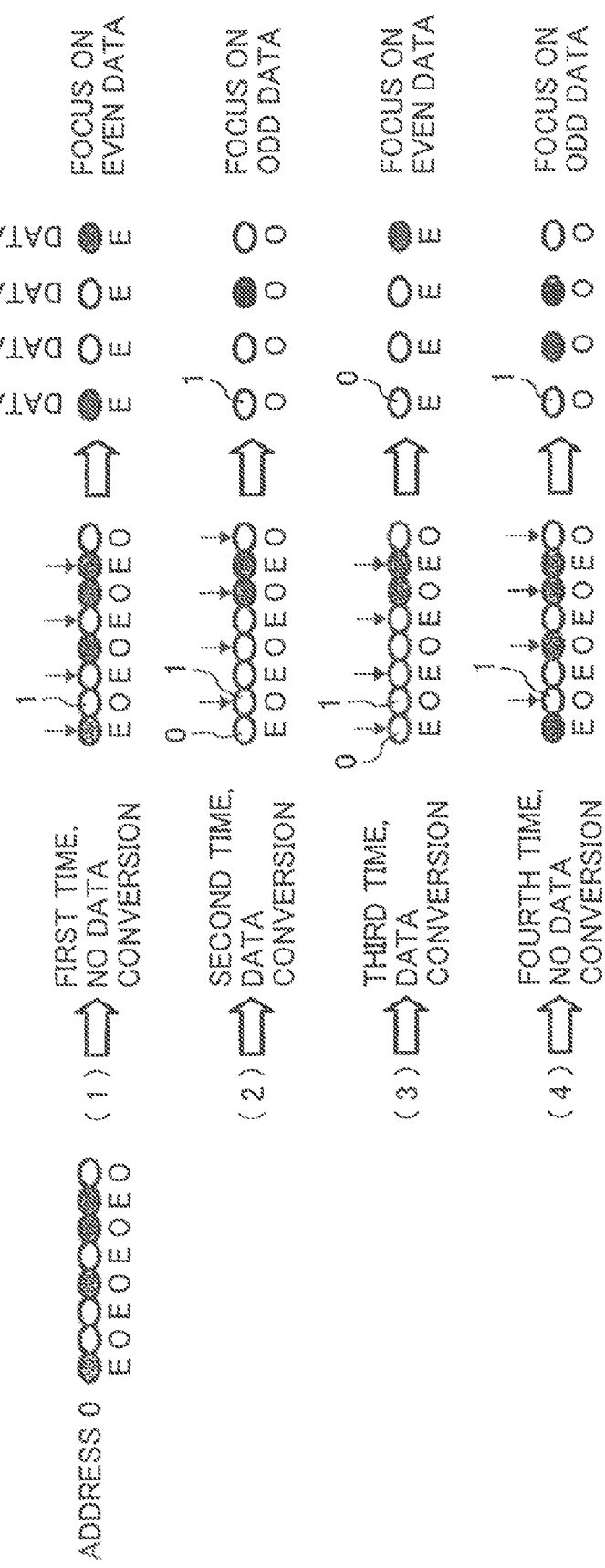
FIG. 5 is a schematic diagram for illustrating a method of data processing.

Data processing is explained with eight pixels from address 0 of a storage circuit (SRAM) in FIG. 5 as an example. In the transfer of (1), focusing on even data, only the even data is selected out of eight pixels of image data read out from the storage circuit and transferred to the LED head by a unit of four bits. Four pixel data are simply selected out of eight pixels without performing one pixel conversion. This control is control without data processing.

In the transfer of (2), focusing on odd data, if data is "0", "0" is directly transferred. When data is "1", if the previous pixel (even pixel) data is "1", "1" is directly transferred. However, if the previous pixel data is "0", data is converted into "0" and transferred.

From the figure, assuming that a black circle is "1" and a white circle is "0", when the eight pixel data are rearranged, the address 0 is 10010110.

Thus, since data processing is carried out in pattern recognition, 10010110 is converted into 00000110. 0010 equivalent to four pixels of odd data is selected from 00000110 and transferred to the LED head. This control is control with data processing.

The data transfer of (3) is performed with data processing as in (2). Even pixel data of 10010110→00000110 is selected and 0001 equivalent to four pixels is transferred to the LED head. In the data transfer of (4), focusing on odd pixel data, data conversion is performed without data processing as in (1), only odd pixel data of 10010110 data is selected, and 0110 is transferred to the LED head. As described above, the image data is transferred in an order of (1), (2), (3), and (4), the data processing control is performed, and the lighting signal STRB is controlled in the next data transfer period to make it possible to variably control a duty width (a LOW period).

In a third embodiment according to the present invention, it is possible to faithfully represent an image concentration by subjecting the duty width to ratio control. This is related to a sixth embodiment described later. In a copier mode, data transfer is performed once and a lighting signal is controlled once. In other words, the data transfer (1) to (2) is performed and the STRB signal is set to 5 and 6 in FIG. 4. At 5 and 6, 10% printing is performed.

In this embodiment, data transfer is performed twice ((1) and (2) is first data transfer and (3) and (4) is second data transfer) and the STRB signal is controlled to duty 10% at 5 and 7 and is controlled to duty 10% at 6 and 8. This 10% is distributed at 3:1 by ratio control to transfer data. Thus, a ratio of the STRB signal is 7.5% and 2.5%.

In a fourth embodiment according to the present invention, a ratio of the STRB signal and presence or absence of the data processing are related to each other. When the data processing is not performed, the STRB signal lights dots at the ratio 3, that is, 7.5%. When the data processing is performed, the STRB signal lights dots at the ratio 1, that is, 2.5%. Thus, in 5, 6, 7, 8 in FIG. 4, the STRB signal is 7.5%, 2.5%, 2.5%, and 7.5%, respectively.

According to this control, it is possible to reduce lighting of a one-dot isolated point from 10% to 7.5%, control dot power, and reduce thickness of the vertical line.

Figure 4:
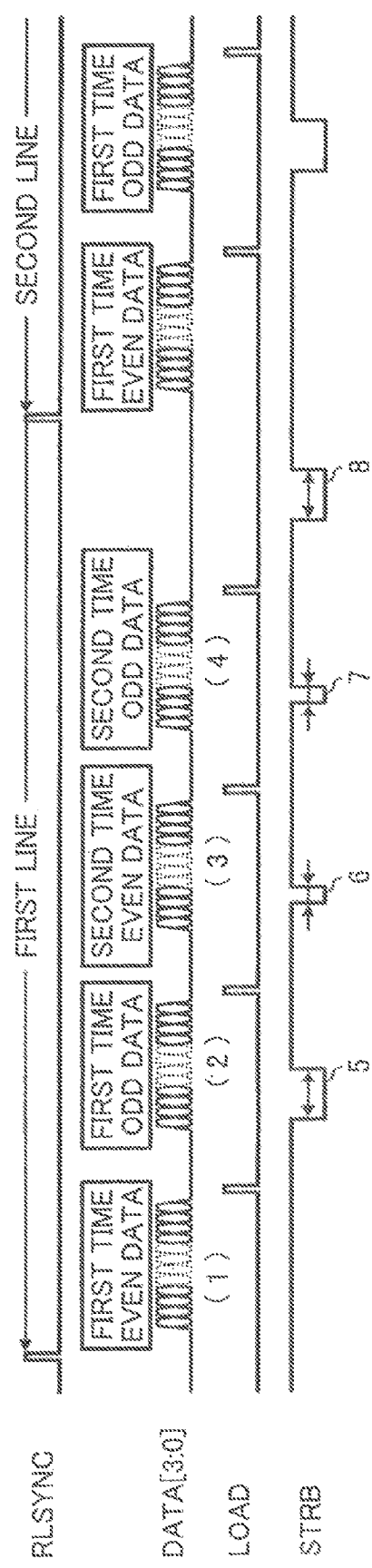
FIG. 4 is a schematic diagram for illustrating data transfer to an LED head.

In a fifth embodiment according to the present invention, the transfer system in FIG. 4 is exactly used. In (1) and (4), the data processing is not performed and the STRB signal is at 7.5% (ratio 3). In (2) and (3), the data processing is performed and the STRB signal is at 2.5% (ratio 1). Since data and lighting time at an end are extended, an edge effect is realized. Thus, it is possible to emphasize one line, that is, a horizontal line width.

In a sixth embodiment, it is possible to switch an output mode to a copier mode and a printer mode. Thus, it is possible to faithfully realize an image in image processing in the copier mode and gradation and a line image in data processing in the printer mode. This control is control in the printer mode.

Figure 6:
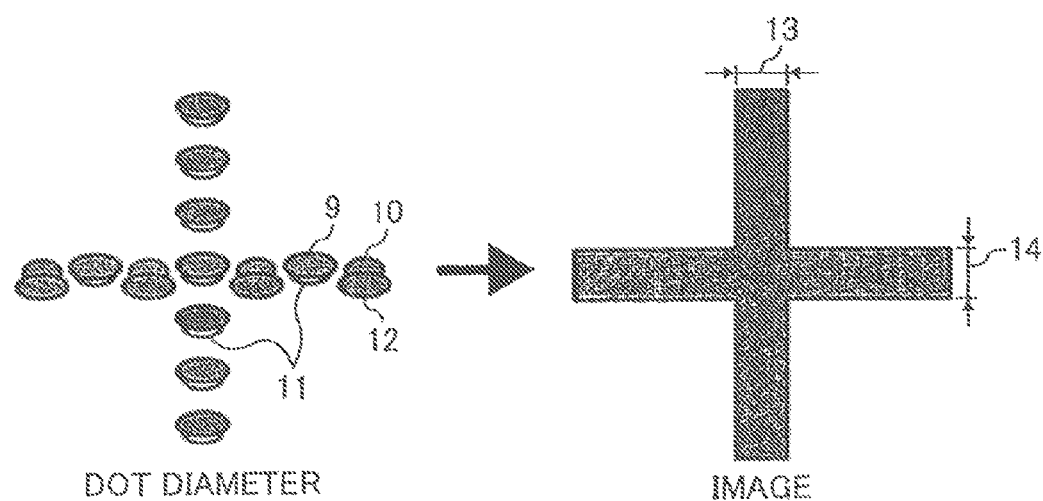
FIG. 6 is a schematic diagram for illustrating a dot diameter and an image.

FIG. 6 is a schematic diagram for illustrating a print dot diameter and an image of one-dot cross. Even pixel data 9 is printed at the duty of 7.5%, and then, odd data 10 is printed at the duty of 2.5%. Since the duty is 2.5%, dot power is small. Subsequently, even pixel data 11 is printed at the duty of 2.5%.

When one-dot isolated point is recognized as a pattern, the isolated point is compared with an adjacent pixel. If data changes from "1" to "0", printing is not performed. Finally, odd pixel data 12 is printed at the duty of 7.5%. Thus, as the dot diameter, in the vertical line, pixel data is printed only at the duty of 7.5% according to data processing control. In the horizontal line, pixel data is printed at the duty of 10% (2.5%+ 7.5%) and concentration is emphasized by the edge effect. According to the printing form described above, a ratio of a vertical line width 13 and a horizontal line width 14 of the image is improved.

Although the invention has been described with respect to a specific embodiment for a complete and clear disclosure, the appended claims are not to be thus limited but are to be construed as embodying all modifications and alternative constructions that may occur to one skilled in the art that fairly fall within the basic teaching herein set forth.

What is claimed is:

1. A digital writing apparatus comprising:
a plurality of array units each including
a light-emitting device array in which a plurality of light-emitting devices are arrayed in one direction, the light-emitting devices configured to emit light based on binary image data; and
an image forming unit configured to form an image with light emitted from the light-emitting device array on a photosensitive member; and
an image transfer unit configured to divide image data equivalent to one line for each of the array units, to transfer to respective array unit, and to drive each of the light-emitting devices to perform main scanning, wherein
the array units are arranged such that each of the array units is shifted by a predetermined amount from each other in a sub-scanning direction and overlapped with each other by a predetermined amount in a main scanning direction, the main scanning direction being an axial direction of the photosensitive member,
the image transfer unit is configured to transfer divided data for a plurality of times and to variably control, using a control signal having a varying period, a lighting time of a plurality of light-emitting devices at a same time using the control signal having the varying period while subjecting the image data to data processing in a period of scanning one line in the main scanning direction, and depending on whether or not the data processing related to the image data is performed, a ratio of a duty width of the control signal is varied to control a lighting time for a one-dot isolated point.

2. The digital writing apparatus according to claim 1, wherein the image transfer unit is configured to repeat, for a plurality of times, a transfer operation in which transfer of even pixel data is performed, and then, transfer of odd pixel data is performed, and the lighting time is equivalent to number of the transfer.

3. The digital writing apparatus according to claim 2, wherein, the lighting time is controlled based on a ratio to a lighting time in a copier mode.

4. The digital writing apparatus according to claim 1, wherein the image transfer unit is configured to perform pattern recognition in the main scanning direction during the data processing, and is configured to transfer data when a one-dot isolated point "1" is recognized, such that if the data processing is not performed, "1" is transferred without conversion, and if the data processing is performed, "1" is converted into "0" to be transferred, and the lighting time is extended by increasing a lighting ratio when the data processing is not performed.

5. The digital writing apparatus according to claim 1, wherein the data processing is not performed at first data transfer and last data transfer, and is performed at data transfer between the first data transfer and the last data transfer.

6. The digital writing apparatus according to claim 1, wherein the data processing is switched based on an output mode such that in a copier mode, the data transfer is performed only once without data conversion, and in a printer mode, the data transfer is performed twice, and the lighting time follows the data transfer.

7. The digital writing apparatus according to claim 1, further comprising:

a memory which stores correction data for each of the light-emitting devices, wherein a light amount output by the light-emitting devices is controlled by the correction data which correspond to the light-emitting devices, and also controlled by the control signal having the varying period.

8. The digital writing apparatus according to claim 7, wherein:

the memory which stores correction data is mounted on the light-emitting device array units.

9. The digital writing apparatus according to claim 1, wherein the image transfer unit is configured to variably control a duty width of the control signal.

10. The digital writing apparatus according to claim 1, wherein the image transfer unit is configured to subject a duty width of the control signal to ratio control.

* * * * *